Jan. 13, 1948.   P. B. STEED ET AL   2,434,597
ARC FURNACE ELECTRODE FEED REGULATOR SYSTEM
Filed Nov. 29, 1944
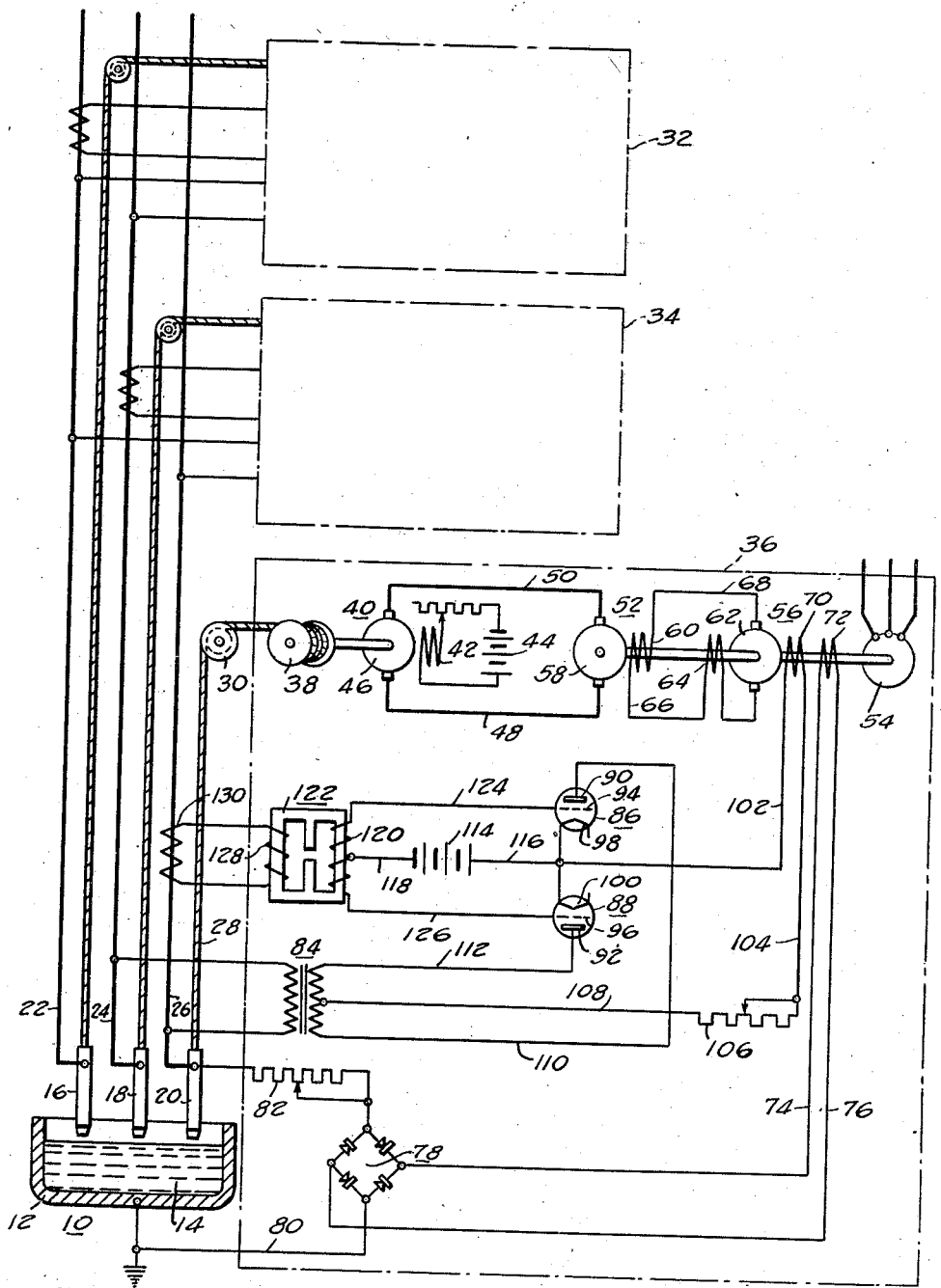
WITNESSES:
E. A. McCloskey
Wm. C. Groome
INVENTORS
Paul B. Steed and Cyril C. Levy, deceased,
by Helen A. Levy, Executrix.
BY
James N. Ely
ATTORNEY Patented Jan. 13, 1948

2,434,597

UNITED STATES PATENT OFFICE 2,434,597

ARC FURNACE ELECTRODE FEED REGULATOR SYSTEM

Paul B. Steed, Detroit, Mich., and Cyril C. Levy, deceased, late of Wilkinsburg, Pa., by Helen A. Levy, executrix, Wilkinsburg, Pa., assignors to Westinghouse Electric Corporation, East Pittsburgh, Pa., a corporation of Pennsylvania Application November 29, 1944, Serial No. 565,722

5 Claims. (Cl. 314—75)

This invention relates to regulator systems, and, in particular, to regulators for governing the operation of the movable electrodes of electric arc furnaces.

In operating an electric furnace of the movable electrode type, it is desirable to automatically raise and lower each electrode in accordance with some furnace condition, and to maintain a substantially constant electrode arc. Heretofore, the regulation has been obtained by utilizing a measure of the current flowing through the arc and the voltage drop across the arc to control the operation of an electrode motor. However, the current flowing through the arc tends to vary at a fast rate, with the result that it is sometimes difficult to obtain stable regulation.

An object of this invention is to provide a regulating system for arc furnaces, in which provision is made to regulate the electrode arc in accordance with the power factor of the arc.

Another object of this invention is to utilize a measure of the power factor of the arc in an arc furnace, to regulate the operation of the electrode motor utilized for positioning the electrode.

Other objects of this invention will become apparent from the following description, when taken in conjunction with the accompanying drawing the single figure of which is a diagrammatic view of circuits and apparatus illustrating embodiments of this invention.

Referring to the drawing, an arc furnace 10 is illustrated, having a metal receptacle or shell 12 containing a bath of material 14, and having three movable electrodes 16, 18 and 20 positioned adjacent thereto. The electrodes 16, 18 and 20 are connected by conductors 22, 24 and 26, respectively, to a suitable source of power through a power transformer (not shown). Means, such as a flexible cable 28 and a pulley 30 are provided, being associated with each of the electrodes for raising and lowering the electrodes. Three rectangular areas 32, 34 and 36 are indicated, each representing the apparatus associated with one of the three phases for operating the phase electrodes 16, 18 and 20, respectively. Since the operating mechanism for each of the three phases is identical, only one of the operating mechanisms is illustrated in detail and shown enclosed in the rectangular area 36.

As illustrated, the flexible cable 28 may be wound upon a winding drum 38 operated by a reversible electrode motor 40. The electrode motor 40 comprises a field winding 42 disposed to be energized from any suitable direct-current source, such as the battery 44, and an armature winding 46 connected by conductors 48 and 50 to a main generator 52 that is driven by an alternating-current motor 54 and excited by an exciter generator 56.

The main generator 52 comprises an armature winding 58 connected to the conductors 48 and 50 and a field winding 60 disposed to be supplied with energy from the armature winding 62 of the exciter generator 56. As illustrated, one terminal of the armature winding 62 is connected through a self-exciting winding 64 for the exciter generator 58 and conductor 66 to a terminal of the field winding 60, the other terminal of the armature winding 62 being connected by conductor 68 to the other terminal of the field winding 60 of the main generator 52. The exciter generator 56 is also provided with two control field windings 70 and 72 which are disposed to be energized so as to oppose each other and cooperate in controlling the excitation of the exciter generator 56.

The control field winding 72 is connected by conductors 74 and 76 to the output terminals of a full-wave rectifier 78, one of the input terminals of which is connected by conductor 80 to the casing or shell 12 of the furnace 10, the other input terminal of the rectifier being connected through an adjustable resistor 82 to the electrode 20. The resistor 82 is provided for adjusting the voltage supplied to the rectifier 78 with respect to the voltage across the furnace arc. The control field winding 72 is thus energized at a voltage that is a measure of the drop in voltage across the furnace arc.

The control field winding 70 is disposed to be energized in response to the power factor of the arc. As illustrated, the control field winding 70 is connected to be energized by the transformer 84, the primary winding of which is connected across phase conductors 24 and 26. A pair of electric discharge devices 86 and 88 are connected to rectify the current flowing from the secondary winding of transformer 84 to and through the control field winding 70.

The valves 86 and 88 are similar, having anodes 90 and 92, respectively, grids 94 and 96, respectively, and cathodes 98 and 100, respectively. The control field winding 70 has one of its terminals connected by conductor 102 to a common lead between the cathodes 98 and 100 of the valves 86 and 88, respectively, and the other terminal is connected by conductor 104, adjustable resistor 106 and conductor 108 to the mid- or center-tap of the secondary winding of the transformer 84, the terminals of the secondary winding being connected by conductors 110 and 112 to the anodes 90 and 92, respectively, of the valves 86 and 88. The adjustable resistor 106 is included in the circuit just described, in order to provide an adjustment for determining or limiting the maximum current flow in the control field winding 70, to determine or balance the energization of the winding 70 in opposition to that of the winding 72.

In order to provide a negative bias on the grids 94 and 96, a battery 114 is connected in the grid circuit of the valves 86 and 88, one terminal of the battery being connected by conductor 116 to the common lead between the cathodes 98 and 100 of the valves, the other terminal of the battery being connected by conductor 118 to the mid- or center-tap of the secondary winding 120 of an impulse transformer 122, the terminals of the secondary winding 120 being connected by conductors 124 and 126 to the grids 94 and 96, respectively, of the valves 86 and 88.

Each of the valves 86 and 88 has the characteristic that when used on alternating-current voltage, if rendered conducting by a grid impulse, it will conduct current for the remaining portion of the positive half-cycle of the voltage wave, but will be rendered non-conducting when the voltage decreases to the arc-drop value of the valve, and will not be reestablished during the negative half-cycle of that voltage wave. By utilizing two valves in opposition, as described, full-wave rectification and control of current flowing in the control field winding 70 may be obtained.

The impulse transformer 122 is provided for controlling the firing of the valves 86 and 88 in response to the phase angle of the current flowing through phase conductor 26 and the arc between electrode 20 and the bath of material 14. As illustrated, the primary winding 128 of the impulse transformer 122 is connected across a current transformer 130, which is disposed in inductive relation with the phase conductor 26. The impulse transformer 122 is of a type well-known to industry, the leg of the magnetic core upon which the secondary winding 120 is wound being so designed that it will saturate very early in the current cycle and, as a result of the rapid saturation, will provide a peaked impulse of considerable magnitude. Thus, although the valves 86 and 88 are normally maintained non-conducting by the negative bias applied thereto by the battery 114 in the grid circuit when the impulse transformer 122 impresses its peaked voltage on the grid biasing circuits, the grids 94 and 96 are alternately rendered less negative, or more positive, to cut the critical grid voltage of the valves and render them conductive.

The phase position of the alternate impulses impressed on the grid circuits by the impulse transformer 122 are dependent upon the angle of the current flowing through the arc. Since the valves 86 and 88 are connected so as to be of opposite polarity, one-half of the secondary winding 120 being associated with each of the valves, the valves are alternately rendered conducting by the peaked voltage being impressed upon the half of the secondary winding 120 associated with the respective valves. Thus, at unity power factor, the impulse comes at the peak of the positive half-cycle of the voltage wave associated with the respective valves, whereas, for a leading power factor of the arc, the impulse comes at an earlier time in the positive half-cycle of the voltage wave associated with the respective valves, and, for a lagging power factor, the impuse comes later in the positive half-cycle of the voltage wave associated with the valves. Thus, with the secondary winding 120 being divided and each half of the winding 120 being connected in the grid circuits as described, the valves 86 and 88 are alternately rendered conducting in response to the power factor of the furnace arc. As the current passed by the valves 86 and 88 determines the energization of the control field winding 70 and as the firing of the valves is controlled by the phase angle of the current in phase conductor 26, it is apaprent that the energization of the control field winding 70 is dependent upon and is a measure of the power factor of the arc.

When the operation is first started, the three electrodes 16, 18 and 20 are in a raised position out of contact with the body of material 14, which is to be heated in the furnace receptacle 12. Under these conditions, no current will be flowing through the electrodes 16, 18 and 20, and the control field winding 70 will be deenergized. The voltage between the electrode 20 and the shell 12 will, however, be a maximum whereby the control field winding 72 will be fully energized.

The control field winding 72 thus excites the exciter generator 56 to develop a voltage which is applied to the main generator field winding 60, having a polarity to cause the main generator 52 to build up in a direction to operate the motor 40 to move the electrode 20 downwardly. As the exciter voltage in the armature 62 builds up, the flow of current through the self-energizing winding 64 increases to increase the rate of voltage build-up of the exciter generator 56, thus causing this voltage to build up more rapidly than it otherwise would. Thus, under the influence of the field windings 64 and 72, the motor 40 is operated to rapidly lower the electrode 20 to a position where it contacts the material 14 in the furnace 12.

When the electrodes 16, 18 and 20 are lowered and the first one, in this case electrode 20, engages the material 14, the voltage of the arc impressed across the rectifier 78 and consequently across the field winding 72 collapses or drops to a very low value. Thus, in effect, the control field winding 72 is shorted out of service, and if the voltage on the control field winding 72 collapses, it causes a corresponding reduction in the output voltage of the exciter generator 56 and of the main generator 52 which is applied to the electrode motor 40. When one of the other electrodes, 16 or 18, is lowered sufficiently to also engage the bath of material 14, a current starts to flow through the bath between the electrodes, and a resistance drop in voltage between the electrodes and the casing 12 appears, thus causing an increase in voltage between the electrodes and the casing 12 with a corresponding increase in the energization of the control field winding 72. The effect of the control field winding 72 on the exciter generator 56 is in a direction to tend to operate the motor 40 in a direction to lower the electrode 20, as explained hereinbefore. However, since current is now flowing through the arc, the control field winding 70 will be energized, so as to develop a flux to oppose the flux developed by the field winding 72. The direction in which the motor 40 will now operate is, therefore, dependent upon which of the two control field windings 70 or 72 predominate.

When the flux produced by the field winding 70 is greater than that produced by the control field winding 72, the flux will cause the exciter generator 56 to develop a voltage having a polarity such as energizes the main generator field winding 60 in a direction to impress a voltage on the motor armature 46 having a polarity to cause the motor 40 to operate in a direction to raise the electrode 20. In a similar manner, if the flux developed by the control field winding 72 is greater than that developed by the control field winding 70, the polarity of the voltage developed by the exciter generator 56 will be reversed, thus impressing a voltage on the armature 46 of the motor 40, such as to cause the electrode 20 to be lowered.

In normal operation, the resistors 82 and 106 are adjusted, so that the control field windings 70 and 72 will be substantially equally energized, but in opposition for a given position of the electrode 20 with respect to the material 14 and, consequently, for a predetermined power factor of the arc. Under such conditions, the control field windings 70 and 72 neutralize each other, and the electrode 20 is maintained stationary relative to the material 14.

If, during the normal operation of the furnace, the power factor of the arc should vary from the predetermined power factor selected for balanced operating conditions as, for example, if the power factor should increase tending toward a more leading power factor, the increase in current flow through the phase conductor 26 will cause the impulse transformer 122 to saturate earlier in the positive half-cycle, whereby more current flows through the control field winding 70 to upset the balance between the field windings 70 and 72 and effect an operation of the motor 40 to raise the electrode 20 to a position where the power factor of the arc returns to the initially predetermined power factor required.

If, on the other hand, the power factor should tend toward a more lagging power factor, then the saturation of the impulse transformer 122 comes at a later period in the positive half-cycle of the voltage wave with the result that the valves 86 and 88 are rendered conducting at a later time in the positive half-cycle of the voltage wave associated with the respective valves and the current flowing through the control field winding 70 is decreased. When this occurs, the control field winding 72 so energizes the exciter generator 56 as to effect an operation of the electrode motor 40 to lower the electrode 20 to a position where the power factor is returned to the predetermined power factor required.

By utilizing the system of this invention, it is apparent that an automatic control of the positioning of the electrodes in an arc furnace is obtained, so as to maintain a substantially constant power factor of the furnace arc. Further, since the power factor of the arc does not change as rapidly as the current flowing through the arc, it is apparent that a more stable regulation is obtained than where the regulation is dependent upon a balance between the current and voltage of the arc.

Although this invention has been described with reference to a particular embodiment thereof, it is, of course, not to be limited thereto, except insofar as is necessitated by the scope of the appended claims.

We claim as our invention:

1. In a furnace-regulator system, the combination with a movable electrode, a motor for operating the electrode, and a main generator for supplying energy to the motor, of means for governing the operation of the motor to regulate the arc, said means comprising an exciter generator connected for exciting the main generator, a pair of oppositely energized control field windings for the exciter generator, means for energizing one of said pair of control field windings with a current that is a measure of the voltage across the arc, and means for energizing the other one of said pair of control field windings with a current that is a measure of the power factor of the arc.

2. In a furnace-regulator system, the combination comprising, a movable electrode, a motor for operating the electrode, means for controlling the operation of the motor to control the arc, said means including a pair of control voltages having opposite polarities, one of said pair of control voltages being a measure of the voltage across the arc, means including a pair of electric valves disposed to control the other one of said pair of control voltages, each of the electric valves having a grid to be utilized for controlling the conductivity thereof, and a grid circuit for each of the valves responsive to the phase angle of the current flowing through the electrode for controlling the bias of the grids and the output of the valves whereby the other one of said pair of control voltages is a measure of the power factor of the arc.

3. In a furnace-regulator system, the combination with a movable electrode, a motor for operating the electrode, and a main generator for supplying energy to the motor, of means for governing the operation of the motor to regulate the arc, said means comprising an exciter generator connected for exciting the main generator, a pair of oppositely energized control field windings for the exciter generator, means for energizing one of said pair of control field windings with a current that is a measure of the voltage across the arc, means including a pair of electric valves disposed to connect the other one of said pair of control field windings to a source of power, each of the electric valves having a grid to be utilized for controlling the conductivity thereof, and a grid circuit for the valves responsive to the phase angle of the current flowing through the electrode for controlling the bias of the grids to control the energization of the other one of said pair of control field windings.

4. In a furnace-regulator system, the combination with a movable electrode, a motor for operating the electrode, and a main generator for supplying energy to the motor, of means for governing the operation of the motor to regulate the arc, said means comprising an exciter generator connected for exciting the main generator, a pair of oppositely energized control field windings for the exciter generator, means for energizing one of said pair of control field windings with a current that is a measure of the voltage across the arc, means including a pair of electric valves disposed to control the other one of said pair of control voltages, each of the electric valves having a grid to be utilized for controlling the conductivity thereof, and means for rendering the grids positive in response to the phase angle of the current flowing through the electrode, the positive biasing means including an impulse transformer connected to be responsive to the flow of current through the electrode.

5. In a furnace-regulator system, the combination comprising, a movable electrode, a motor for operating the electrode, means for controlling the operation of the motor to control the arc, said means including a pair of control voltages having opposite polarities, one of said pair of control voltages being a measure of the voltage across the arc, means including a pair of electric valves disposed to control the other one of said pair of control voltages, each of the electric valves having a grid to be utilized for controlling the conductivity thereof, and means for rendering the grids positive in response to the phase angle of the current flowing through the electrode, the positive biasing means including an impulse transformer connected to be responsive to the flow of current through the electrode.

PAUL B. STEED.
HELEN A. LEVY,
*Executrix of the Estate of Cyril C. Levy, Deceased.*

REFERENCES CITED

The following references are of record in the file of this patent:

UNITED STATES PATENTS

| Number | Name | Date |
|---|---|---|
| 2,419,988 | Davis | May 6, 1947 |
| 1,989,546 | Chapman | Jan. 29, 1935 |
| 2,007,751 | Chapman | July 9, 1935 |

FOREIGN PATENTS

| Number | Country | Date |
|---|---|---|
| 373,735 | Great Britain | June 2, 1932 |
| 629,620 | France | Aug. 1, 1927 |